United States Patent [19]

Takayama et al.

[11] Patent Number: 5,237,029

[45] Date of Patent: Aug. 17, 1993

[54] POLYMERIZABLE MOLDING LIQUID RESINS, COMPOSITIONS CONTAINING SAME AND IN-MOLD CURED PRODUCTS THEREFROM

[75] Inventors: Yuuji Takayama, Kanagawa; Hirokazu Matsueda, Aichi; Masato Sugiura, Aichi; Tatsuhiko Ozaki, Aichi; Hirotaka Wada, Aichi; Iwao Komiya, Aichi, all of Japan

[73] Assignee: Takemoto Yushi Kabushiki Kaisha, Aichi, Japan

[21] Appl. No.: 851,636

[22] Filed: Mar. 16, 1992

[30] Foreign Application Priority Data

Apr. 3, 1991 [JP] Japan .................................. 3-99622

[51] Int. Cl.$^5$ ........................... C08F 2/44; C08F 22/14
[52] U.S. Cl. ..................................... 526/301; 524/850
[58] Field of Search ................. 526/301; 524/700, 850

[56] References Cited

U.S. PATENT DOCUMENTS

| | | | |
|---|---|---|---|
| 3,907,751 | 9/1975 | Knight et al. | 526/301 |
| 4,480,079 | 10/1984 | Orton et al. | 526/301 |
| 4,717,739 | 1/1988 | Chevreux et al. | 526/301 X |
| 4,835,233 | 5/1989 | Renzi et al. | 526/301 |
| 4,879,402 | 11/1989 | Reiners et al. | 526/301 X |
| 4,912,185 | 3/1990 | Toh | 526/301 |

*Primary Examiner*—Joseph L. Schofer
*Assistant Examiner*—R. H. Delmendo
*Attorney, Agent, or Firm*—Heller, Ehrman, White & McAuliffe

[57] ABSTRACT

Radical polymerizable liquid resins contain unsaturated urethane of a specified structure and vinyl monomers at weight ratio of (unsaturated urethane)/(vinyl monomers)=10/90–90/10. The unsaturated urethane has (meth)acryloyl and higher aliphatic hydrocarbon groups in its molecule, and the vinyl monomers are copolymerizable with this unsaturated urethane. Radical polymerizable liquid resin compositions are obtained by adding inorganic powder filler to such radical polymerizable liquid resins In-mold cured products obtained from such radical polymerizable resins or radical polymerizable resin compositions have improved water resistance and other favorable properties

8 Claims, No Drawings

POLYMERIZABLE MOLDING LIQUID RESINS, COMPOSITIONS CONTAINING SAME AND IN-MOLD CURED PRODUCTS THEREFROM

BACKGROUND OF THE INVENTION

This invention relates to radical polymerizable liquid resins for in-mold curing (hereinafter referred to simply as liquid resins), radical polymerizable liquid resin compositions for in-mold curing which contain such liquid resins (hereinafter referred to simply as liquid resin compositions) and in-mold cured products obtained from such liquid resins and liquid resin compositions.

Liquid resin compositions containing liquid resins are widely in use. For example, molded products from liquid resin compositions containing unsaturated polyester resin, which is a representative example of liquid resins, have been used as external panels and accessories of automobiles. There are a number of molding methods available for obtaining molded objects from liquid resin compositions, including the compression molding method using sheet molding compound (SMC), the injection molding method using bulk molding compound (BMC), the hand lay-up method whereby liquid resin impregnates a reinforcing fiber mat, textile or strands and is hardened, and the pultrusion method. In addition, examples of method known as the most ideal and economical for obtaining molded objects include the resin transfer molding (RTM) and reaction injection molding (RIM) whereby a liquid resin composition is introduced into a mold for quick in-mold curing.

As an example of prior art liquid resin, U.S. Pat. No. 4,480,079 and European Patent Publication EP197682 have disclosed liquid resins comprising unsaturated urethane and alkyl (meth)acrylate obtained from polyisocyanate and hydroxyl alkyl (meth)acrylate.

The aforementioned prior art liquid resins, however, have the following disadvantages because of their use of unsaturated urethane obtained from polyisocyanate and hydroxy alkyl (meth)acrylate:

(1) Since unsaturated urethane and alkyl (meth)acrylate, which are obtained together by such a prior art method, are not sufficiently compatible with respect to each other, sedimentation and separation are likely to take place especially at low temperatures;

(2) Since unsaturated urethane thus obtained contains many urethane bonds within its molecule, it is inferior in water resistance, like most other kinds of polyurethane liquid resin, as compared to other thermosetting liquid resins. This limits the use of the in-mold cured products obtained therefrom; and (3) Since the density of cross-links is high in such in-mold cured products, mold shrinkage at the time of their curing is large compared to unsaturated polyester liquid resins. As a result, generation of cracks and appearance of fiber patterns are prominently observed. Low shrinkage agents may be used for preventing such phenomena but they are not very effective.

SUMMARY OF THE INVENTION

The basic object of the present invention is to eliminate the disadvantages (1)–(3) given above related to prior art liquid resins containing unsaturated urethane.

In other words, it is an object of the present invention to provide liquid resins and liquid resin compositions comprising unsaturated urethane and vinyl monomers with improved compatibility with respect to each other.

It is another object of the present invention to provide liquid resins and liquid resin compositions which comprise unsaturated urethane having higher aliphatic hydrocarbon groups and have improved water resistance.

It is still another object of the present invention to provide liquid resins and liquid resin compositions from which in-mold cured objects with lower density of cross-links can be obtained.

It is a further object of the present invention to provide in-mold cured products which are made from such liquid resins or liquid resin compositions and on which cracks and fiber patterns do not show easily.

The present inventors have conducted research on liquid resins comprising unsaturated urethane and vinyl monomers which can be copolymerized therewith, as well as liquid resin compositions containing such liquid resins and in-mold cured products obtained from such liquid resins or liquid resin compositions. As a result of research, in particular, on the relationship between the chemical structure of unsaturated urethane and the characteristics of in-mold cured products therefrom, it has been discovered that it is preferable to use, at a specified ratio, unsaturated urethane having introduced thereinto specified amounts of radical polymerizable groups comprising (meth)acryloyl groups and hydrophobic groups including higher hydrocarbon residual groups.

DETAILED DESCRIPTION OF THE INVENTION

This invention relates firstly to liquid resins comprising unsaturated urethane shown by Formula (1) given below and vinyl monomers, which are copolymerizable with this unsaturated urethane, at the weight ratio of (unsaturated urethane)/(vinyl monomers)=10/90–90/10:

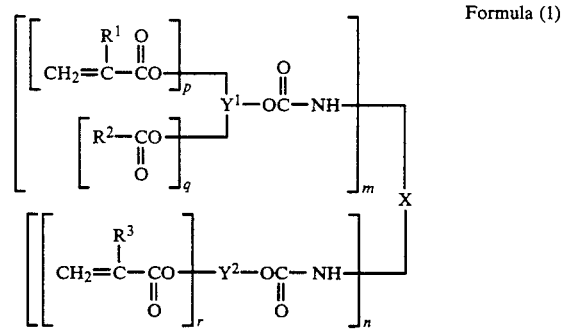

Formula (1)

where X is a residual group obtained by removing isocyanate group from polyisocyanate; $Y^1$ is a residual group obtained by removing hydroxyl group from trihydric or tetrahydric alcohol; $Y^2$ is a residual group obtained by removing hydroxyl group from dihydric-tetrahydric polyol; $R^1$ and $R^3$ are each H or $CH_3$; $R^2$ is higher aliphatic hydrocarbon group with 5–21 carbon atoms; m is an integer 1–4; n is an integer 0–3 such that $2 \leq m+n \leq 4$; p and q are 1 or 2 such that p+q is 2 or 3; and r is an integer 1–3 such that $(pm+rn) \geq 2$.

Secondly, the present invention relates to liquid resin compositions containing such liquid resins. Thirdly, the present invention relates to in-mold cured products obtained from such liquid resins or liquid resin compositions.

The unsaturated urethane shown by Formula (1) for liquid resins of the present invention is a urethane compound obtained by reacting mixed ester mono-ol of (meth)acrylic and higher aliphatic acids (hereinafter referred to simply as mixed ester mono-ol) with polyisocyanates, or by reacting mixed ester mono-ol and (meth)acrylic ester mono-ol with polyisocyanates.

The mixed ester mono-ol includes partial esters which are derived from (meth)acrylic acid, higher aliphatic acid with 6–22 carbon atoms and trihydric or tetrahydric alcohol and have one free hydroxyl group in the molecule. When such a partial ester is derived, the molar ratios of (meth)acrylic acid and higher aliphatic acid to be used with 1 mole of polyhydric alcohol are determined such that one free hydroxyl group will remain.

Examples of mixed ester mono-ol include (1) mixed ester mono-ols derived from trihydric alcohol such as glycerine monomethacrylate.monooctanoate, trimethylol propane monoacrylate.monoisononanoate, 5-methyl-1,2,4-heptane triol monomethacrylate.monooleate, and 1,2,6-hexane triol monomethacrylate.mono2-ethyl hexoate, and (2) mixed ester mono-ols derived from tetrahydric alcohol such as pentaerythritol dimethacrylate.monoisostearate and pentaerythritol monomethacrylate.diisooctanoate. Among them, mixed mono-ols of glycerine mono(meth)acrylic acid.mono-higher aliphatic acid can be used effectively.

Such mixed ester mono-ols can be obtained, for example, by ring-opening addition reaction between glycidyl (meth)acrylate and higher aliphatic acid or between glycidyl ester of higher aliphatic acid and (meth)acrylic acid.

Examples of polyisocyanates to be reacted with mixed ester mono-ol include: (1) diisocyanates such as many kinds of tolylene diisocyanate, methylene-bis-(4-phenylisocyanate) and hexamethylene diisocyanate; (2) triisocyanates such as hexamethylene diisocyanate cyclic trimer (Kolonate EH ®, produced by Nippon Polyurethane Industry Co., Ltd.) the reaction product of hexamethylene diisocyanate and trimethylol propane at molar ratio of 3/1 (Kolonate HL ®, produced by Nippon Polyurethane Industry Co., Ltd.), and (3) polyisocyanates having more than 3 isocyanate groups per molecule on the average such as polymethylene polyphenyl polyisocyanate (Millionate MR ®, produced by Nippon Polyurethane Industry Co., Ltd.).

As the unsaturated urethane according to the present invention, use may be made of urethane compounds obtained by substituting a portion of the aforementioned mixed ester mono-ols by (meth)acryl ester mono-ols and reacting them with polyisocyanates, the (meth)acryl ester mono-ols being partial esters which are derived from (meth)acrylic acid and dihydric tetrahydric polyols.

Examples of (meth)acryl ester mono-ol include: (1) mono(meth)acrylates of dihydric alcohol such as 2-hydroxyethyl acrylate, 2-hydroxyethyl methacrylate, 2-hydroxypropyl methacrylate, 4-hydroxybutyl methacrylate and 1,6-hexane diol monoacrylate; (2) di(meth)acrylates of trihydric alcohol such as glycerine diacrylate, glycerine dimethacrylate, trimethylol propane dimethacrylate, 5-methyl-1,2,4-heptane triol dimethacrylate and 1,2,6-hexane triol dimethacrylate; (3) tri(meth)acrylates of tetrahydric alcohol such as pentaerythritol triacrylate and pentaerythritol trimethacrylate; (4) di(meth)acrylates of (poly)ether triol such as ethyleneglycol monoglycerylether dimethacrylate, (poly)ethoxylated trimethylol propane dimethacrylate, (poly)propoxylated trimethylol propane diacrylate and (poly)ethoxylated glycerine; and (5) tri(meth)acrylates of (poly)ether tetraol such as diglycerine triacrylate, (poly)ethoxylated pentaerythritol trimethacrylate and ethyleneglycol diglycerylether trimethacrylate.

As for (poly)ether polyols to be used for deriving such (meth)acryl ester mono-ols, those with molecular weight of 100 or less per hydroxyl group in the molecule are favored. Those of 80 or less are particularly desirable.

As explained above, the unsaturated urethane to be used in this invention includes urethane compounds obtained by reacting mixed ester mono-ol with polyisocyanate or by reacting mixed ester mono-ol and (meth)acryl ester mono-ol (hereinafter referred to simply as ester mono-ols) with polyisocyanate. The molar numbers of mixed ester mono-ol/(meth)acryl ester mono-ol to be used per mole of polyisocyanate are 1/1 in the case of diisocyanate, 1/2–2/1 in the case of triisocyanate and 1/3–3/1 in the case of tetraisocyanate. The ratio of reacting polyisocyanates/ester mono-ols at the time of synthesizing unsaturated urethane is preferably 1/1 by molar ratio of functional groups (NCO/OH), but no serious problem will be encountered if it is varied within the range of 1/0.95–0.95/1.

According to accepted methods of synthesizing unsaturated urethane, an inactive solvent is added to mixed ester mono-ols or its mixture with (meth)acryl ester mono-ols as ester mono-ols. A catalyst such as tertiary amine, metallic salt or preferably di-n-butyl tin dilaurate, which are well known for the synthesis of polyurethane, is used, and polyisocyanate is gradually added while temperature is maintained at 30°–80° C. In this situation, it is preferable to use a vinyl monomer such as alkyl (meth)acrylate or styrene as the inactive solvent because there will then be no deed to remove it after the reaction.

There is no particular limitation as to the kind of vinyl monomers to be used as reaction dilutant for unsaturated urethane in connection with liquid resins of the present invention, as long as they are copolymerizable with the unsaturated urethane. Examples of such vinyl monomers include (1) alkyl (meth)acrylates such as methyl methacrylate, methyl acrylate, ethyl methacrylate and ethyl acrylate, (2) vinyl aromatic hydrocarbons such as styrene, methyl styrene and divinyl benzene, and (3) diallyl phthalate. They may be used singly or as a mixture of two or more. From the point of view of the properties of the in-mold cured products obtained therefrom, however, methyl methacrylate, styrene and their mixtures are preferable.

Liquid resins according to the present invention comprise unsaturated urethane and vinyl monomers which are copolymerizable with the unsaturated urethane, their weight ratio being (unsaturated urethane)/(vinyl monomers) being 10/90–90/10 and, more preferably, 40/60–75/25. If this ratio is smaller than 10/90, the curing speed is too low and the physical properties of the in-mold cured products obtained from them become poorer. If it exceeds 90/10, on the other hand, viscosity of the liquid resin becomes too high.

The unsaturated urethane according to the present invention has within its molecule at least two radical polymerizable double bonds and at least one higher aliphatic hydrocarbon group. The number of such double bonds contained in a molecule and the molecular weight of the unsaturated urethane per double bond affect the speed of its curing speed. In order to obtain a practically convenient curing reaction speed, the unsaturated urethane should be such that its molecular weight per such double bond is 550 or less and, more preferably, in the range of 300–450.

Liquid resins according to the present invention do not develop precipitation or separation even at a cooler temperature and are generally stable because their unsaturated urethane and vinyl monomers have superior compatibility. The in-mold cured products from such liquid resins or liquid resin compositions containing such liquid resins have reduced problems related to water resistance and mold shrinkage.

In order to realize such characteristics, higher aliphatic hydrocarbon groups with 5–21 carbon atoms are introduced into the unsaturated urethane molecules according to the present invention. Particularly preferable examples of such higher aliphatic hydrocarbon groups include alkyl and isoalkyl groups with 7–18 carbon atoms and alkenyl groups with 16–21 carbon atoms. It is also preferred that the number of higher aliphatic hydrocarbon groups to be introduced be 1–3 per unsaturated urethane molecule and that their ratio be 15–35 weight %. In this manner, it is possible to obtain an appropriate speed of curing reaction and improved thermal properties for the in-mold cured product.

Next, the liquid resin compositions of the present invention will be explained. The liquid resin composition of the present invention include aforementioned liquid resins and organic powder filler material. There is no particular limitation on the amount of the filler material to be contained. It varies according to its kind, size, the molding method of liquid resin composition and the desired properties of the obtained in-mold cured products. In general, however, it is less than 230 weight parts against 100 weight parts of the liquid resin, and preferably less than 100 weight parts.

Examples of organic powder filler material include alumina trihydrate ($Al_2O_3.3H_2O$), calcium carbonate, silica and calcium sulfate dihydrate ($CaSO_4.2H_2O$). If use is made of a material containing water of crystallization, flame-retarding property can be gained by the in-mold cured products to be obtained by curing.

Many methods for preparing unsaturated polyester liquid resins can be used for the preparation of liquid resin compositions of the present invention.

The products according to the present invention are obtained by in-mold curing of liquid resins or liquid resin compositions of the present invention. In-mold curing methods known for unsaturated polyester liquid resins and their compositions can be applied. For example, curing agents and curing accelerators of many kinds can be used for radical polymerization.

Examples of curing agent include dibenzoyl peroxide, t-butyl peroxy-2-ethyl hexanoate, t-butyl peroxy benzoate, 1,1-di-t-butyl peroxy-3,3,5-trimethyl cyclohexane, and bis(4-t-butyl cyclohexyl) peroxy dicarbonate. They may be used singly or as a mixture of two or more. Examples of curing accelerator include tertiary amines such as N,N-dimethyl-p-toluidine and N,N-dimethyl aniline The curing agent is normally used at the rate of 1-5 weight % with respect to the liquid resin of the present invention or the whole of the liquid resin composition of the invention. A mold releasing agent may also be used in the case of in-mold curing. Examples of such mold releasing agent include metallic soap of, say, zinc stearate, and Zelec UN (which is a trade name for phosphoric ester produced by E. I. duPont de Nemours and Co.).

Liquid resins and liquid resin compositions of the present invention can be easily cured and molded by any of the in-mold curing methods such as the pultrusion method, the injection molding by the use of BMC, the compression molding by using SMC, the resin transfer molding, and the reaction injection molding.

The present invention will be described next by way of examples such that its characteristics and effects can be more clearly understood, but the present invention is not intended to be limited by these examples. In what follows, weight parts will be simply referred to as parts, and weight % will be simply referred to as %.

Tests and Results

Test Example 1 (Synthesis of unsaturated urethane A and preparation of liquid resin a)

Methacrylic acid 86 parts (1.0 mole) and triethyl amine 3 parts as catalyst were maintained at 60° C. and stirred, and glycidyl octoate 200 parts (1.0 mole) was dropped in over a period of 30 minutes. The synthesis was completed thereafter by keeping the reacting system for 5 hours at 70° C. Hardly any oxylan oxygen was detected in the product. The reaction product thus obtained was glycerine monomethacrylate monooctanoate. Its hydroxyl value was 195, its acid value was 1.0, and its saponification value was 394.

Glycerine monomethacrylate.monooctanoate 286 parts (1.0 mole) thus obtained, methyl methacrylate 249 parts and di-n-butyl tin dilaurate 1 part were stirred while being maintained at 50° C., and Kolonate T-80 ® (mixture of 2,4- and 2,6-tolylene diisocyanate produced by Nippon Polyurethane Industry, Co., Ltd.) 87 parts (0.5 mole) was dropped in over a period of 30 minutes. Reaction heat was generated during this process but the temperature inside the flask was maintained at or below 60° C. The synthesis was completed by thereafter maintaining it for one hour at 60° C. to obtain liquid resin a containing unsaturated urethane A by 60%. This liquid resin a was left for 24 hours at room temperature but no separation of solid component or turbidity was observed.

Test Example 3 (Synthesis of unsaturated urethane C and preparation of liquid resin c)

Use was made of glycidyl methacrylate 142 parts (1.0 mole), isopalmitic acid 256 parts (1.0 mole) and triethylamine as catalyst 3 parts to synthesize glycerine monomethacrylate.mono-isopalmitate as in the case of glycerine monomethacrylate.mono-octanoate for the synthesis of unsaturated urethane A. Of the reaction product thus obtained, hydroxyl value was 143, acid value was 1.3, and saponification value was 284.

Use was made next of glycerine monomethacrylate.monoisopalmitate 279 parts (0.7 moles), methyl methacrylate 246 parts, di-n-butyl tin dilaurate 0.9 parts and Millionate MR-100 ® (polymethylene polyphenyl isocyanate containing 3.5 isocyanate groups per molecule on the average, produced by Nippon Polyurethane Industry Co., Ltd.) 89 parts (0.2 moles) as in the synthesis of unsaturated urethane A and liquid resin c containing unsaturated urethane C by 60% was obtained. This liquid resin c was left for 24 hours at room temperature but no separation of solid component or turbidity was observed.

Test Example 5 (Synthesis of unsaturated urethane E and preparation of liquid resin e)

Use was made of glycerine monomethacrylate.-monoisopalmitate (same as for the synthesis of unsaturated urethane C) 199 parts (0.5 moles), glycerine dimethacrylate 46 parts (0.2 moles), methyl methacrylate 223 parts, di-n-butyl tin dilaurate 0.9 parts and Millionate MR-100 (the same as used for the synthesis of unsaturated urethane C) 89 parts (0.2 moles) as in the synthesis of unsaturated urethane A and liquid resin e containing unsaturated urethane E by 60% was obtained. This liquid resin e was left for 24 hours at room temperature but no separation of solid component or turbidity was observed.

Test Example 6 (Synthesis of unsaturated urethane F and preparation of liquid resin f)

Use was made of glycerine monomethacrylate.-monolaurate (synthesized as above in the case of glycerine monomethacrylate.monooctanoate for the synthesis of unsaturated urethane A) 171 parts (0.5 moles), 2-hydroxyethyl methacrylate 65 parts (0.5 moles), styrene 215 parts, di-n-butyl tin dilaurate 1.0 part and Kolonate T-80 (the same as for the synthesis of unsaturated urethane A) 87 parts (0.5 moles) as in the synthesis of unsaturated urethane A and liquid resin f containing unsaturated urethane F by 60% was obtained. This liquid resin f was left for 24 hours at room temperature but no separation of solid component or turbidity was observed.

Test Example 2 (synthesis of unsaturated urethane B and preparation of liquid resin b) and Test Example 4 (synthesis of unsaturated urethane D and preparation of liquid resin d) were carried out similarly. The liquid resins b and d were left for 24 hours at room temperature but no separation of solid component or turbidity was observed.

Comparison Example 1 (Synthesis of unsaturated urethane R-1 and preparation of liquid resin r-1)

Liquid resin r-1 containing unsaturated urethane R-1 by 60% was obtained in the same way as for the synthesis of unsaturated urethane C except use was made of 91 parts (0.7 moles) of 2-hydroxyethyl methacrylate instead of 279 parts of glycerine monomethacrylate.-monoisopalmitate and 120 parts instead of 246 parts of 2-hydroxyethyl methacrylate. When this liquid resin r-1 was left for 24 hours at room temperature, generation of turbidity was observed.

Comparison Example 2 (Synthesis of unsaturated urethane R-2 and preparation of liquid resin r-2)

Liquid resin r-2 containing unsaturated urethane R-2 by 60% was obtained in the same way as for the synthesis of unsaturated urethane F except use was made of 130 parts (1.0 mole) of 2-hydroxyethyl methacrylate instead of 171 parts of glycerine monomethacrylate.-monolaurate and 65 parts of 2-hydroxyethyl methacrylate, and 145 parts instead of 215 parts of styrene. When this liquid resin r-2 was left for 24 hours at room temperature, it turned into a paste-like semi-solid.

The kinds of polyisocyanates, mixed ester mono-ols, (meth)acryl ester mono-ols and vinyl monomers which were used for syntheses, as well as the used amounts thereof, are shown in Table 1. The properties of unsaturated urethane obtained in these experiments are shown in Table 2.

Production of molded products by resin transfer molding (RTM) and their evaluation A glass strand continuous mat (Unifilo U-750, produced by Nippon Electric Glass Co., Ltd.) was set in a nickel metallized mold heated to 35° C. such that the glass content would be 25% and the mold was tightened to 2.5 kg/cm$^2$ Thereafter, measuring pumps were used to mix specified amounts of the liquid resin compositions and radical initiator solutions shown in Table 3 to form uniform mixtures through a static mixer, and such uniform mixtures were individually injected into the mold. The injection was stopped at the point in time when the injected liquid began to flow out from a clearance opposite from the injection opening. The product was taken out of the mold 20 minutes after the injection was stopped. For each product thus obtained, fiber patterns and occurrence of cracks were visually examined. The results are also shown in Table 3.

Production of molded products by casting molding and their evaluation

A polyethylene tube of outer diameter 5 mm was sandwiched between two glass sheets (25 cm × 25 cm) of thickness 5 mm to form a mold with a clearance of 3 mm. The liquid resins and radical initiator solutions shown in Table 4 were uniformly mixed together and poured into this mold. The mold was placed inside a thermostat of 35° C., and it was left overnight at 80° C. to obtain molded products.

Test pieces of length 80 mm, width 25 mm and thickness 3 mm were prepared by using a diamond cutter to cut these molded products. After these test pieces were accurately weighed, they were immersed in warm water of 80° C. for 30 hours. After they were taken out, their external appearance was examined regarding whitening and occurrence of cracks. The weight of each test piece was compared before and after the testing to calculate the water absorbing capacity according to the formula given below. The flexural strength was also measured according to JIS-K6911 to determine the lowering in flexural strength.

Water absorbing capacity (%) = {((Weight after testing) − (Weight before testing))/(Weight before testing)} × 100.

Lowering in flexural strength (%) = {((Strength before testing) − (Strength after testing))/(Strength before testing)} × 100.

These test results are also shown in Table 4, in which the water absorbing capacity and the lowering in flexural strength are shown by an average of three measured values.

As may be already clear from the above, the present invention has the effects of providing liquid resins which do not generate solids or turbidity and have superior compatibility, and molded products with improved appearance and water-resistance and small mold shrinkage.

TABLE 1

| Unsaturated urethane Type | Polyisocyanates Type | Amount | Mixed ester mono-ols Type | Amount | (Meth)acryl ester mono-ols Type | Amount | Vinyl monomers Type | Amount |
|---|---|---|---|---|---|---|---|---|
| A | TDI | 87 / 0.5 | *1 | 286 / 1.0 | — | — | MMA | 249 |
| B | HMDI | 84 / 0.5 | *2 | 342 / 1.0 | — | — | MMA | 284 |
| C | MPI | 89 / 0.2 | *3 | 279 / 0.7 | — | — | MMA | 246 |
| D | TDI | 87 / 0.5 | *1 | 143 / 0.5 | DEMA | 87 / 0.5 | MMA | 211 |
| E | MPI | 89 / 0.2 | *3 | 199 / 0.5 | GDM | 46 / 0.2 | MMA | 223 |
| F | TDI | 87 / 0.5 | *2 | 171 / 0.5 | HEMA | 65 / 0.5 | ST | 215 |
| R-1 | MPI | 89 / 0.2 | — | — | HEMA | 91 / 0.7 | MMA | 120 |
| R-2 | TDI | 87 / 0.5 | — | — | HEMA | 130 / 1.0 | ST | 145 |

Notes:
Amount: Upper and lower numbers indicate parts and moles.
TDI: Tolylene diisocyanate
HMDI: Hexamethylene diisocyante
MPI: Polymethylene polyphenyl polyisocyanate (NCO 3.5 on average)
*1: Glycerine monomethacrylate.monooctanoate
*2: Glycerine monomethacrylate.monolaurate
*3: Glycerine monomethacrylate.monoisopalmitate
DEMA: Diethyleneglycol monomethacrylate
GDM: GLycerine dimethacrylate
HEMA: 2-hydroxyethyl methacrylate
MMA: Methyl methacrylate
ST: Styrene

TABLE 12

| Unsaturated urethane Type | Molecular weight (a) | Number of radical polymerizable double bonds in one molecule (b) | a/b | Content of higher alkyl groups (weight %) |
|---|---|---|---|---|
| A | 746 | 2 | 373 | 26.5 |
| B | 852 | 2 | 426 | 36.4 |
| C | 1840 | 3.5 | 526 | 40.1 |
| D | 634 | 2 | 317 | 15.6 |
| E | 1670 | 4.5 | 371 | 31.6 |
| F | 646 | 2 | 323 | 24.0 |
| R-1 | 900 | 3.5 | 257 | 0 |
| R-2 | 434 | 2 | 217 | 0 |

TABLE 3

| (Liquid resin compositions) | Test Examples 7 | 8 | 9 | 10 | 11 | 12 | Comparison Examples 3 | 4 | 5 | 6 |
|---|---|---|---|---|---|---|---|---|---|---|
| Liquid resin | a / 100 | b / 100 | c / 100 | d / 100 | e / 100 | f / 100 | r-1 / 100 | r-2 / 100 | r-1 / 100 | r-2 / 100 |
| Aluminum hydroxide | 50 | 50 | 50 | 50 | 50 | 50 | 50 | 50 | 50 | 50 |
| Dimethyl-p-toluidine | *4 | *4 | *4 | *4 | *4 | *4 | *4 | *4 | *4 | *4 |
| Mold releasing agent | 0.5 | 0.5 | 0.5 | 0.5 | 0.5 | 0.5 | 0.5 | 0.5 | 0.5 | 0.5 |
| Low shrinking agent | — | — | — | — | — | — | — | — | 40 | 40 |
| (Radical initiator) *5 | 2.0 | 2.0 | 2.0 | 2.0 | 2.0 | 2.0 | 2.0 | 2.0 | 2.0 | 2.0 |
| (Results) | | | | | | | | | | |
| Fiber patterns | No | No | No | No | No | No | Yes | Yes | Yes | Yes |
| Occurrence of cracks | No | No | No | No | No | No | Yes | Yes | Yes | Yes |

Notes:
Liquid resin: Type (upper line) Weight part (lower line)
Mold releasing agent: Mold Wiz (produced by Kozakura Shokai Co., Ltd.)
Low shrinking agent for Comparison Example 5: 40 parts of polyvinyl acetate (molecular weight = 200,000) dissolved in 60 parts of methyl methacrylate
Low shrinking agent for Comparison Example 6: 33.3 parts of polypropylene adipate (molecular weight = 5000) dissolved in 66.7 parts of styrene
*4: 0.075
*5: 50% solution of dibenzoyl peroxide (Nyper BMT-M produced by Nippon Oil and Fats Co., Ltd.)
Spots of phase-separated portions of low shrinking agents were observed on the surfaces of molded products from Comparison Examples 5 and 6.

TABLE 4

| (Liquid resin and others) | Test Examples 13 | 14 | 15 | 16 | 17 | 18 | Comparison Examples 7 | 8 | 9 | 10 |
|---|---|---|---|---|---|---|---|---|---|---|
| Liquid resin | a | b | c | d | e | f | r-1 | r-2 | r-1 | r-2 |

TABLE 4-continued

| (Liquid resin and others) | Test Examples | | | | | | Comparison Examples | | | |
|---|---|---|---|---|---|---|---|---|---|---|
| | 13 | 14 | 15 | 16 | 17 | 18 | 7 | 8 | 9 | 10 |
| | 100 | 100 | 100 | 100 | 100 | 100 | 100 | 100 | 100 | 100 |
| Dimethyl-p-toluidine *4 | *4 | *4 | *4 | *4 | *4 | *4 | *4 | *4 | *4 | *4 |
| Mold releasing agent | 0.5 | 0.5 | 0.5 | 0.5 | 0.5 | 0.5 | 0.5 | 0.5 | 0.5 | 0.5 |
| Low shrinking agent | — | — | — | — | — | — | — | — | 40 | 40 |
| (Radical initiator) *5 | 2.0 | 2.0 | 2.0 | 2.0 | 2.0 | 2.0 | 2.0 | 2.0 | 2.0 | 2.0 |
| (Results) | | | | | | | | | | |
| Whitening and Cracks | No | No | No | No | No | No | Yes | Yes | Yes | Yes |
| Water absorbing Capacity | 0.3 | 0.2 | 0.2 | 0.4 | 0.3 | 0.3 | 1.0 | 0.9 | 1.2 | 1.2 |
| Lowering in flexural strength | 11.5 | 10.1 | 9.8 | 12.0 | 10.4 | 11.2 | 27.6 | 25.3 | 29.5 | 29.0 |

Notes:
See Notes to Table 3 regarding the liquid resins, mold releasing agents, low shrinking agents, *4 and *5.

What is claimed is:

1. Radical polymerizable liquid resin comprising unsaturated urethane shown by Formula (1) given below and vinyl monomers at the weight ratio of (unsaturated urethane)/(vinyl monomers)=10/90–90/10, said vinyl monomers being copolymerizable with said unsaturated urethane:

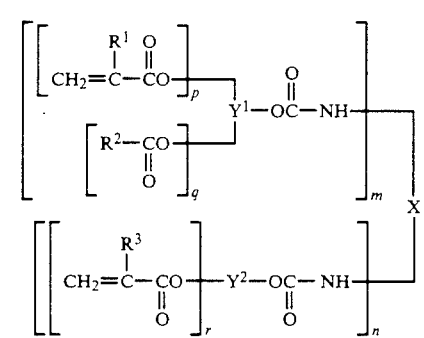

Formula (1)

where X is a residual group obtained by removing isocyanate group from polyisocyanate; $Y^1$ is a residual group obtained by removing hydroxyl group from trihydric or tetrahydric alcohol; $Y^2$ is a residual group obtained by removing hydroxyl group from dihydric, trihydric or tetrahydric polyol; $R^1$ and $R^3$ are each H or $CH_3$; $R^2$ is higher aliphatic hydrocarbon group with 5–21 carbon atoms; m is an integer 1–4; n is an integer 0–3 such that $2 \leq m+n \leq 4$; p and q are 1 or 2 such that p+q is 2 or 3; and r is an integer 1–3 such that $(pm+rn) \geq 2$.

2. The radical polymerizable liquid resin of claim 1 wherein said vinyl monomers are methyl methacrylate, styrene or a mixture thereof.

3. Radical polymerizable liquid resin composition comprising radical polymerizable liquid resin and inorganic powder filler, said radical polymerizable liquid resin comprising unsaturated urethane shown by Formula (1) given below and vinyl monomers at the weight ratio of (unsaturated urethane)/(vinyl monomers)=10/90–90/10, said vinyl monomers being copolymerizable with said unsaturated urethane:

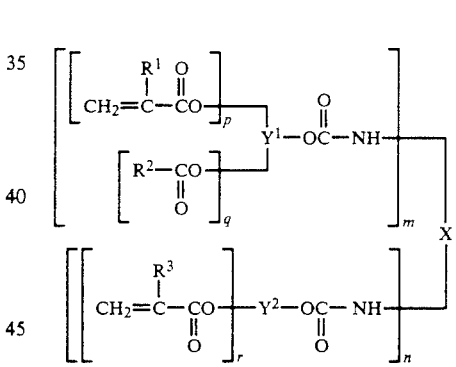

Formula (1)

where X is a residual group obtained by removing isocyanate group from polyisocyanate; $Y^1$ is a residual group obtained by removing hydroxyl group from trihydric or tetrahydric alcohol; $Y^2$ is a residual group obtained by removing hydroxyl group from dihydric, trihydric or tetrahydric polyol; $R^1$ and $R^3$ are each H or $CH_3$; $R^2$ is higher aliphatic hydrocarbon group with 5–21 carbon atoms; m is an integer 1–4; n is an integer 0–3 such that $2 \leq m+n \leq 4$; p and q are 1 or 2 such that p+q is 2 or 3; and r is an integer 1–3 such that $(pm+rn) \geq 2$.

4. The radical polymerizable liquid resin composition of claim 3 wherein said vinyl monomers are methyl methacrylate, styrene or a mixture thereof.

5. A molded product obtained by in-mold curing of radical polymerizable liquid resin which comprises unsaturated urethane shown by Formula (1) given below and vinyl monomers at the weight ratio of (unsaturated urethane)/(vinyl monomers)=10/90–90/10, said vinyl monomers being copolymerizable with said unsaturated urethane:

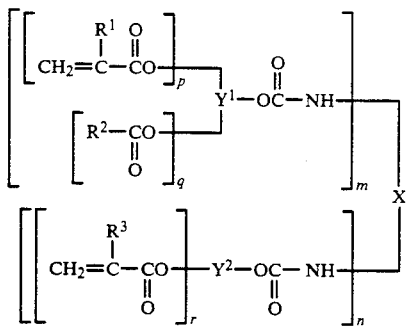

Formula (1)

where X is a residual group obtained by removing isocyanate group from polyisocyanate; $Y^1$ is a residual group obtained by removing hydroxyl group from trihydric or tetrahydric alcohol; $Y^2$ is a residual group obtained by removing hydroxyl group from dihydric, trihydric or tetrahydric polyol; $R^1$ and $R^3$ are each H or $CH_3$; $R^2$ is higher aliphatic hydrocarbon group with 5-21 carbon atoms; m is an integer 1-4; n is an integer 0-3 such that $2 \leq m+n \leq 4$; p and q are 1 or 2 such that p+q is 2 or 3; and r is an integer 1-3 such that $(pm+rn) \geq 2$.

6. The molded product of claim 5 wherein said vinyl monomers are methyl methacrylate, styrene or a mixture thereof.

7. A molded product obtained by in-mold curing of radical polymerizable liquid resin composition which comprises radical polymerizable liquid resin and inorganic powder filler, said radical polymerizable liquid resin comprising unsaturated urethane shown by Formula (1) given below and vinyl monomers at the weight ratio of (unsaturated urethane)/(vinyl monomers) = 10/90-90/10, said vinyl monomers being copolymerizable with said unsaturated urethane: Formula (1)

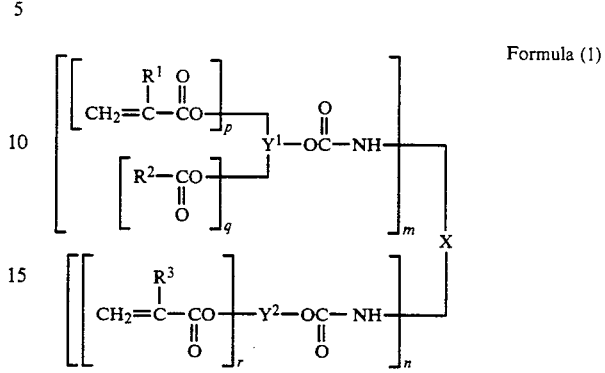

Formula (1)

where X is a residual group obtained by removing isocyanate group from polyisocyanate; $Y^1$ is a residual group obtained by removing hydroxyl group from trihydric or tetrahydric alcohol; $Y^2$ is a residual group obtained by removing hydroxyl group from dihydric, trihydric or tetrahydric polyol; $R^1$ and $R^3$ are each H or $CH_3$; $R^2$ is higher aliphatic hydrocarbon group with 5-21 carbon atoms; m is an integer 1-4; n is an integer 0-3 such that $2 \leq m+n \leq 4$; p and q are 1 or 2 such that p+q is 2 or 3; and r is an integer 1-3 such that $(pm+rn) \geq 2$.

8. The molded product of claim 7 wherein said vinyl monomers are methyl methacrylate, styrene or a mixture thereof.

* * * * *